H. O. BLUMBERGER.
DRINKING VESSEL FOR CAGES FOR THE TRANSPORT OF BIRDS.
APPLICATION FILED AUG. 26, 1909.
1,012,589.
Patented Dec. 26, 1911.
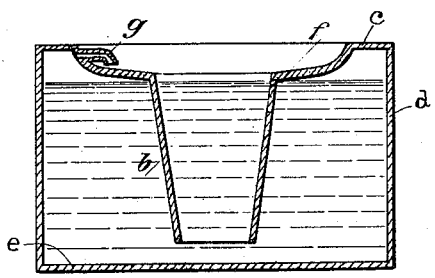
Witnesses:
Inventor:
Heinrich Oscar Blumberger,
by Frank S. Appleman
Atty.

UNITED STATES PATENT OFFICE.

HEINRICH OSCAR BLUMBERGER, OF LEIPZIG-GOHLIS, GERMANY.

DRINKING VESSEL FOR CAGES FOR THE TRANSPORT OF BIRDS.

1,012,589. Specification of Letters Patent. Patented Dec. 26, 1911.

Application filed August 26, 1909. Serial No. 514,804.

*To all whom it may concern:*

Be it known that I, HEINRICH OSCAR BLUMBERGER, merchant, a citizen of Germany, subject of the King of Saxony, residing at Leipzig-Gohlis, in the Kingdom of Saxony and Empire of Germany, have invented certain new and useful Improvements in Drinking Vessels for Cages for the Transport of Birds, of which the following is a full, clear, and exact description.

This invention relates to drinking fountains and troughs, and especially to drinking vessels for use in cages and crates for the shipment of live stock, birds and the like, and has for its several objects: First, to provide a drinking vessel of the character stated to prevent spilling of the water therefrom when the cage or crate containing the vessel is tilted, or handled with unsteady movements; second, to provide means by which the bird may drink, but may not waste the drinking water by bathing therein; and third, to provide a depressed portion in the cover of the vessel for receiving and returning into the funnel water that has accidentally been displaced therefrom.

The foregoing objects are attained by the mechanism hereinafter described and illustrated in the drawing which forms a part of this application, in which the figure represents a centrally vertical section through a drinking vessel embracing the invention.

Referring now to the figure, $d$ represents a receptacle for water having a cover $c$ integrally united therewith. Disposed centrally within said receptacle is a funnel $b$ which is united with the cover $c$ by a concaved portion $f$ of said cover. Said funnel extends toward the bottom $e$ of the vessel but it does not contact therewith. The concaved portion $f$ of the cover has a gradual slope toward the funnel, for the purpose of draining back into the funnel any water that may be accidentally displaced from the funnel. A horizontally disposed tube $g$ extends through the concaved portion and forms a vent whereby air may escape from the receptacle when water is poured into the funnel. Said tube has its exterior end turned downwardly to prevent the entrance of solid matter therein. The further object of this down-turned end is to direct into the concaved portion any water that may be accidentally displaced from the receptacle.

It is obvious that if the vessel were tilted in the direction of the tube $g$ the water would rise and tend to flow out of the tube, and at the same time water from the funnel would flow into the concaved portion and seal the tube $g$ against the admission of air. Therefore the flow of water therefrom would be checked and the vessel would have to be tilted at a very considerable angle in order that the water would spill therefrom.

I claim—

In a drinking vessel, a receptacle for water, a cover having a concaved portion, a funnel united with the concaved portion said concaved portion having a horizontally disposed tube therein, the free end of said tube being turned downwardly for the purpose specified.

In witness whereof, I subscribe my signature, in presence of two witnesses.

HEINRICH OSCAR BLUMBERGER.

Witnesses:
 PAUL ARRAS,
 PAUL H. ALBRICHT.